United States Patent Office 3,399,141
Patented Aug. 27, 1968

3,399,141
HETEROCYCLIC ESTERS OF ALKENYL-
SUCCINIC ANHYDRIDES
David H. Clemens, Willow Grove, Pa., assignor to Rohm
and Haas Company, Philadelphia, Pa., a corporation
of Delaware
No Drawing. Continuation-in-part of application Ser. No.
526,022, Feb. 9, 1966. This application Oct. 27, 1967,
Ser. No. 678,549
11 Claims. (Cl. 252—47.5)

ABSTRACT OF THE DISCLOSURE

This invention is directed to novel heterocyclic esters of alkenylsuccinic anhydrides wherein the alcohol moiety of the ester contains a substituted 2-piperidone. This invention is also directed to lubricating oil and fuel compositions containing these heterocyclic esters of alkenylsuccinic anhydride.

CROSS REFERENCES TO RELATED APPLICATIONS

This application is a continuation-in-part of U.S. application Ser. No. 526,022, filed Feb. 9, 1966, now abandoned.

DETAILED DESCRIPTION OF THE INVENTION

This invention deals with heterocyclic esters of alkenylsuccinic anhydrides. It also deals with lubricating and fuel oil compositions containing these heterocyclic esters of alkenylsuccinic anhydrides. It further deals with a method for the preparation of these heterocyclic esters of alkenylsuccinic anhydrides.

The compounds of the present invention may be represented by the following formulas:

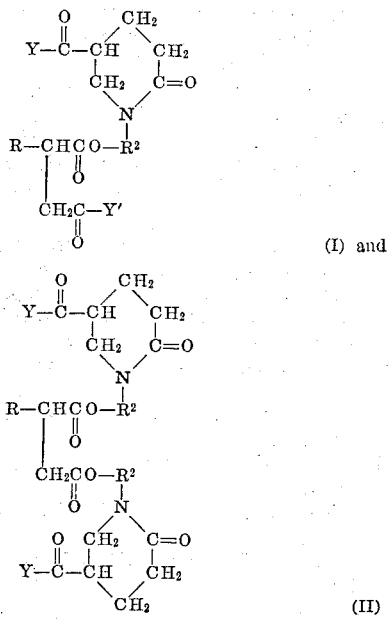

R represents an alkenyl radical containing about 30 to 200 carbon atoms which means it will have a molecular weight of about 400 to about 3000, preferably about 600 to 2500.
$R^2$ represents (a) alkylene, alkenylene and arylene groups of 2 to 25 carbon atoms in which at least two carbons combine to form a chain between the piperidone nitrogen atom and the ether oxygen of the carboxyl group and (b) polyalkylene oxide groups of the following formula:

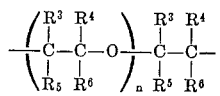

$R^3$, $R^4$, $R^5$ and $R^6$ represent hydrogen, alkyl of 1 to 4 carbon atoms or phenyl groups.

The symbol $n$ represents a number from 1 to 25.

Y represents —OR′, where R′ represents alkyl of 1 to 24 carbon atoms. Y may also represent —NQ$_2$, where Q represents hydrogen or an alkyl of 1 to 24 carbon atoms.

Y′ represents —XZ, where Z is hydrogen, alkyl of 1 to 24 carbon atoms, phenyl, alkylphenyl in which the alkyl substitution contains a total of 1 to 8 carbon atoms, naphthyl, phenylalkyl in which the alkyl contains 1 to 8 carbon atoms. Z is preferably hydrogen, alkyl and phenylalkyl. Also, the alkyl embodiments may contain thio, hydroxy or tertiary amino groups at any possible location. X is a chalcogen having an atomic weight of 16 to 32, i.e., oxygen or sulfur, Y′ may also represent NQ$_2$, where Q is as previously defined.

In addition, Y or Y′ may represent

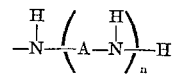

in which A is an alkylene group of 2 to 6 carbon atoms and $n$ is an integer having a value from 1 to 10. While the attachment of the group Y or Y′ in this case has been indicated for convenience as occurring at the terminal nitrogen atom, it will be apparent to one skilled in the art that such attachment could occur at any nitrogen atom along the polyalkylene polyamine chain.

Typical $R^2$ representatives of group (a) are ethylene, butylene, hexylene, octylene, decylene, tetradecylene, octadecylene, 1-methylethylene, 1,2-dimethylethylene, 1-propylethylene, 1-octylethylene, 1-octadecylethylene, trimethylene, octamethylene, eicosamethylene, 1-phenylethylene, 1-(4-but-2-enyl)-ethylene, 3-hexenylene, 1,4-phenylene and 1,4-xylylene.

Typical $R^2$ representatives of group (b) are as follows:

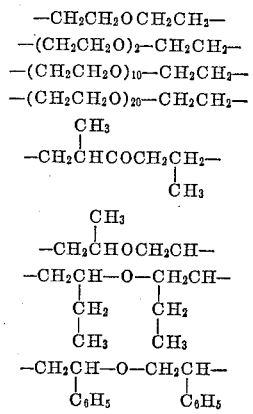

R′ typically represents methyl, ethyl, propyl, butyl, hexyl, octyl, decyl, dodecyl, tetradecyl, octadecyl and eicosyl.

Typically, when Y or Y′ represents NQ$_2$, either or both of the embodiments represented by the symbol Q may be hydrogen, methyl, ethyl, propyl, butyl, hexyl, octyl and decyl.

Z typically represents hydrogen, methyl, ethyl, butyl, cyclopentyl, cyclohexyl, octyl, dodecyl, octadecyl, tetracosyl, phenyl, tolyl, butylphenyl, xylyl, dibutylphenyl, naphthyl, benzyl, phenylbutyl, phenylhexyl, hydroxyethyl, hydroxypropyl, hydroxybutyl, dimethylaminoethyl, diethylaminoethyl, diethylaminobutyl, dipropylaminohexyl, ethylthioethyl and butylthioethyl.

X represents oxygen or sulfur.

A typically represents

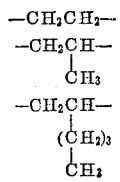

and

The R group is derived by polymerizing an olefin containing 2 to 18 carbon atoms, preferably 2 to 8 carbon atoms, by addition polymerization from substantially pure olefins. These olefins may be either gaseous or liquid under normal conditions and frequently are obtained from the cracking of petroleum and other hydrocarbons. Fractions containing olefinically unsaturated open-chain hydrocarbons are readily available over a wide range of molecular weights and derived from olefins of 2 to 18 carbon atoms. The preferred olefins are those from 2 to 8 carbon atoms with particular emphasis on the olefin embodiments containing 4 carbon atoms. It is, of course, preferred to employ relatively pure olefins from which sulfur, cyclic compounds and other impurities have been removed.

Mixtures of various olefins, from ethylene to octadecene, may be used or individual embodiments, as desired. Mixtures of specific olefins, from ethylene to pentene, may be advantageously employed. Particularly advantageous for the present purposes are mixtures of the various butenes. Butenes most commonly used comprise both straight and branched chain members. It is also possible, and frequently desirable, to employ a particular isomer, such as isobutylene, but for the purposes of this invention, separation or isolation of particular isomers is not essential. Thus, the mixtures readily available to the chemical industry are especially useful for the purposes of the present invention. The olefinic polymers employed as starting materials vary from rather fluid liquids to rather viscous liquids at normal temperatures.

Typical olefinic polymers are those prepared from ethylene, propylene, isobutene, 1-butene, 2-butene, 1-pentene, 2-pentene, 1-hexene, 1-octene, 2-octene, 1-decene, 1-dodecene, 2-dodecene and 1-octadecene.

While the group, R, has been structurally presented as attached to a specific carbon atom with respect to Formulas I and II, it will be understood by those skilled in the art that the R group may be positioned on the other carbon atom that is alpha to the other carbonyl group. The R group enters the molecule concerned by a reaction involving maleic anhydride and, therefore, could be attached to either of the carbon atoms alpha to the carboxyl group. This invention encompasses fully this aspect.

The polyolefin is first reacted with maleic anhydride at temperatures of about 200° to 250° C. for a period of about 6 to 16 hours, as desired. The maleic anhydride is used in excess, preferably about 1.5 to 3 times the stoichiometric amount. The use of excess maleic anhydride tends to maximize yields. The polyolefin reacts with maleic anhydride to form a succinic anhydride derivative which can be separated from the excess maleic anhydride by vacuum distillation or similar treatment. The product can be diluted with xylene or similar solvent and filtered.

The compounds of the present invention are made by reacting an olefinic succinic anhydride of the formula

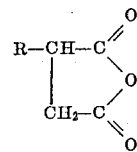

with the compound having the formula

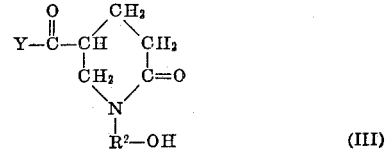

at a temperature of about 30° to 250° C., preferably 70° to 150° C., wherein a monoester product is obtained corresponding to Formula I wherein within the definition of the symbol Y', X is oxygen and Z is hydrogen. To obtain a diester corresponding to Formula II, one conducts the reaction at a temperature of about 130° to about 250° C. with the liberation of water, which is preferably removed as it is formed. During the reaction that leads to the monoester of Formula I, no water is evolved.

In order to produce a compound corresponding to Formula I, other than where X is oxygen and Z is hydrogen, one reacts in a conventional manner the Formula I monoester with a compound having the formula:

$$Y'H \qquad (IV)$$

If desired, in many instances, one may prefer to reverse the order of reaction and first react the olefinic succinic anhydride with a compound (IV) followed by reaction with a compound (III).

One preferably employs the reactant of Formulas III or IV in amounts that correspond to the desired product of either the monoester of Formula I or the diester of Formula II. As will be understood by those skilled in the art, mixtures of products may be obtained in some instances. These are useful for the present purposes and encompassed within the gamut of this invention.

At the conclusion of the reaction, the xylene or other suitable solvent that has been employed during the reaction, is removed, preferably by stripping, and the product is then ready for addition to a lubricating oil or fuel.

Typical embodiments of the reactant (III) include:

N-[2-hydroxypropyl]-5-carbomethoxy-2-piperidone,
N-hydroxyethyl-5-carbethoxy-2-piperidone,
N-2-hydroxyethyl-5-carbobutoxy-2-piperidone,
N-hydroxyethyl-5-carbododecoxy-2-piperidone,
N-hydroxyethyl-5-carboeicosyl-2-piperidone,
N-2-hydroxyethyl-5-N-methylcarbamyl-2-piperidone,
N-2-hydroxyethyl-5-N-n-butylcarbamyl-2-piperidone,
N-3-hydroxypropyl-5-N-n-octylcarbamyl-2-piperidone,
N-[2-hydroxydecaethoxyethyl]-5-N-t-octylcarbamyl-2-piperidone,
N-[1-methyl-2-hydroxypropyl]-5-N-methylcarbamyl-2-piperidone,
N-(2-hydroxydecyl)-5-N,N-dimethylcarbamyl-2-piperidone, and
N-[2-hydroxy-2-phenylethyl]-5-N-t-octylcarbamyl-2-piperidone.

Typical embodiments of reactant (IV) include ammonia, methylamine, ethylamine, t-butylamine, t-octylamine, octadecylamine, dimethylamine, diethylamine dibutylamine didodecylamine, aniline, naphthylamine, phenylbutylamine, diethylaminoethanol, dibutylaminohexanol, ethylthioethanol, butylthioethanol, octylthiooctanol, ethylene oxide, propylene oxide, butylene oxide, methanol ethanol, butanol cyclohexanol, octanol dodecanol, tetradecanol and octadecanol.

The piperidones of Formula III are prepared by reacting a compound of the formula

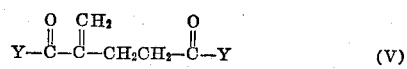

(V)

with a compound containing both primary amine and hydroxyl groups as defined by the formula

(VI)

wherein Y and R² are as previously defined. Preferred Formula V compounds are α-methyleneglutarates, α-methyleneglutaramides and α-methyleneglutaramates, but particularly preferred are the α-methyleneglutarates described in U.S. Patents 3,074,999 and 3,342,853.

The process for preparing Formula III type compounds involves contacting approximately equimolar quantities of a reactant from Formula V and Formula VI at a temperature sufficiently high to cause reaction and formation of the Formula III compounds. If desired, the reaction may be conducted in the presence of various inert solvents. Representative inert organic solvents are hydrocarbons such as benzene and toluene, ethers, chlorinated hydrocarbons, nitriles, alcohols and esters. However, satisfactory yields are obtained in the absence of any solvent and, for economic reasons, it is preferable to carry out the reaction in the absence of any solvent.

The reaction is generally carried out at elevated temperatures, in order to increase the rate of reaction. Temperatures of from 35° C. to 200° C. may be used with the preferred range being 80–150° C. The reaction may be conducted at atmospheric pressure or at reduced pressure. Super-atmospheric pressures may be employed but appear to provide no particular advantage. Preferably, it is desirable to conduct the reaction at a reduced pressure to facilitate the removal of the byproduct created by the condensation reaction of the Formula V and the Formula VI compound. If the Formula V compound is an α-methyleneglutarate, the byproduct is an alcohol.

The following examples A to D are illustrative methods for preparing Formula III compounds.

Example A

Preparation of N-hydroxyethyl-5-carbethoxypiperidone-2.—To a 2 liter reactor arranged for stirring, heating and vacuum distillation, 800.8 parts of diethyl-α-methylene glutarate and 244.4 parts of monoethanolamine were charged. The pressure was adjusted to 100 mm. of Hg and the reaction temperature was gradually raised to 120° C. over a 2 hour period while distilling the byproduct alcohol. The temperature is maintained at 120–130° and the pressure at 100 mm. of Hg for two hours and then the pressure was gradually reduced to 33 mm. of Hg over a 4.5 hour period. A vacuum of 0.15 mm. was applied with the batch at 100° C. until no more volatiles were obtained. The residue was 826.5 parts of N-hydroxyethyl-5-carbethoxypiperidone-2. The following analysis was obtained:

| Analysis | Calculated | Found |
|---|---|---|
| Percent carbon | 55.80 | 56.00 |
| Percent hydrogen | 7.96 | 8.16 |
| Percent nitrogen | 6.50 | 6.55 |
| Percent oxygen | 29.74 | 29.77 |
| Molecular wt | 215.25 | 272 |
| Hydroxyl number | 262 | 227 |

Example B

Preparation of N-hydroxyethoxyethyl-5-carbethoxypiperidone-2.—To a 1 liter reactor arranged for stirring, heating and vacuum distillation, 400.5 parts of diethyl-α-methylene glutarate and 210.3 parts of diglycolamine (H₂NCH₂CH₂OCH₂CH₂OH) were charged. The pressure was reduced to 100 mm. of Hg. The batch was heated to 120° C. over a 0.5 hour period and the temperature was maintained at 120–130° C. over a five hour period while distilling alcohol. The pressure was reduced over a two hour period to 32 mm. of Hg while maintaining a temperature of 120–130° C. A vacuum of 0.25 mm. of Hg was applied with the batch at 100° C. and maintained until no more distillate was obtained. The residue was 509.5 g. of N-hydroxyethoxyethyl-5-carbethoxypiperidone-2.—The following analysis was obtained.

| Analysis | Calculated | Found |
|---|---|---|
| Percent carbon | 55.58 | 55.71 |
| Percent hydrogen | 8.16 | 8.26 |
| Percent nitrogen | 5.40 | 5.42 |
| Percent oxygen | 30.86 | 30.65 |
| Molecular wt | 259.3 | 312 |
| Hydroxyl number | 216.5 | 193 |

Example C

Preparation of N-hydroxyethyl-5-carbomethoxypiperidone-2.—To a 500 ml. reactor, 172.2 parts of dimethyl-α-methyleneglutarate and 61.1 parts of monoethanolamine were charged and the mixture was allowed to stand at room temperature for 72 hours. The pressure was reduced to 100 mm. of Hg and heated to 120° C. over a 1 hour period while distilling methanol. This temperature and pressure were maintained for 2.5 hours and then the pressure was reduced to 30 mm. of Hg over a 3.5 hour period. A vacuum of 0.1 mm. of Hg was applied at a batch temperature of 100° C. and these conditions were maintained until no more volatiles are obtained. The nonvolatile product is 175.3 g. having a hydroxyl number of 274, and the theoretical value is 279.

Example D

Preparation of N-hydroxyethyl-5-N-methylcarbamyl-2-piperidone.—The procedure of Example C was repeated except that the Formula V compound was N,N'-dimethyl-α-methyleneglutaramide.

The compounds of this invention are useful as dispersants in lubricating oil and fuel systems. They may be used in the range of about 0.005 to 15% by weight of the oil or fuel composition and may be incorporated therein according to standard techniques. In fuels, the range is 0.005 to 5%, preferably 0.01 to 2%, by weight of the fuel compositon. In lubricants, the range is 0.1 to 15%, preferably 0.1 to 10%, by weight of the lubricant composition. The compounds of the present invention, as evaluated according to several known tests, exhibit outstanding activity as dispersants. Particularly valuable are those corresponding to Formula II.

It is realized that under some operating conditions varying amounts of warm to hot water will accumulate which in time hydrolyzes to varying extents the piperidone portion of the molecule. This does not interfere with the valuable properties described hereinbefore.

The following describes some of the standard tests employed for evaluating the compounds of this invention.

API Service MS Sequence V Test.—This test evaluates the sludge dispersant characteristics of a lubricant under low and medium temperature operating conditions. An 8-cylinder 386 cu. in displacement Lincoln-Mercury engine is operated under conditions described in ASTM Special Technical Publication No. 315, published by the American Society for Testing and Materials, 1916 Race St., Philadelphia, Pa. 19103.

At the end of 192 hours of operation, the engine is disassembled and rated for sludge deposits. The 8 parts rated for sludge (CRC Merit, 10=clean) are the rocker arm assembly, rocker arm cover plate, push rod cover plate, oil screen, oil pan, valve deck, push rod chamber and timing gear cover.

API Service MS Sequence V-A Test.—This test evaluates the sludge dispersant characteristics of a lubricant under low and medium temperature operating conditions. A single cylinder oil test engine is operated under conditions described in ASTM Special Technical Publication No. 315, published by the American Society for Testing and Materials, 1916 Race St., Philadelphia, Pa. 19103.

The engine may be rated at any time during the course of the test. The 7 parts rated for sludge (CRC Merit, 10=clean) are the rocker arm assembly, rocker arm cover plate, valve deck, timing gear cover, push rod cover plate, push rod chamber and oil pan.

Panel Coker Test.—This test is described in the record of the Fifth World Petroleum Congress (1959) in an article by R. M. Jolie, "Laboratory Screening Test for Lubricating Oil, Detergents and Dispersants." A sample of a compound under test is dissolved in a 170 SUS Mid-Continent Solvent Extracted Neutral containing 1% of a thermally unstable zinc dialkyldithiophosphate. The blend is placed in a heated sump and is splashed against a heated panel held at 570° F. for 2 hours. Gain in weight of the panel is determined and compared to oil without the test compound.

Sundstrand Pump Test.—In this test for distillate fuel oils, 1 liter of fuel oil containing 4 g. of synthetic sludge is treated with the additive. The oil is circulated for an hour through a Sundstrand oil burner pump containing a 100-mesh strainer. The sludge deposit is collected and weighed (Nelson, Osterhaut and Schwindeman, Ind. Eng. Chem., 48, 1892 (1956)).

As will be clearly understood in the art, the fuels contemplated are distillate fuels that boil from 75° to 750° F. which include gasolines, along with jet and Diesel fuels and furnace oils. The present compounds are particularly useful in fuels that boil up to about 600° F., that is, the normal gasolines and jet fuels.

Lubricating compositions of this invention may be based on mineral oils or on synthetic lubricants. The mineral oils may vary over a wide range of viscosity, such as 1 to 25 cst. at 210° F. These oils may be of naphthenic or paraffinic nature or may be of various mixtures. They may be distillates or mixtures of neutral oils and bright stocks. The lubricants may be bodied or gelled and used as greases, if desired. The oils may vary from spindle oils or hydraulic oils to oils for reciprocating aircraft engines. They include oils for sparking combustion and compression ignition engines, varying from grades identified as S.A.E. 5 to S.A.E. 50. Other types of lubricants are also inlcuded, such as hydraulic and automatic transmission fluids.

The synthetic lubricants include esters, such as dioctyl, dinonyl or isodecyl adipates, azelates, or sebacates, polyethers and silicones. When use as hydraulic fluids is contemplated, phosphate esters are included as a base.

In the present compositions, there may also be used as a base, a transmission fluid, hydraulic fluid, gear oil or grease.

In the compositions of this invention, there may be used one or more other additives, such as anti-oxidants, anti-foam agents, anti-rust agents, anti-wear agents, heavy-duty detergents, pour-point depressants, viscosity index improvers, or other type of additive. For example, there may be employed one or more of the dithiophosphates, such as zinc, barium or nickel dialkyldithiophosphate, sulfurized oils, such as sulfurized sperm oil and sulfurized terpenes, phenols, sulfides, alkylaryl sulfonates, petroleum sulfonates whether normal or with alkaline reserve, such as calcium, barium or strontium petroleum sulfonates, polymers and copolymers from alkyl acrylates, methacrylates, itaconates, or fumarates or vinyl carboxylates and mixtures thereof, copolymers of acrylic esters and polar monovinylidene compounds, such as N-vinyl-2-pyrrolidinone, vinylpyridines, aminoalkyl acrylates or methacrylates, or polyethylene-glycol acrylic esters, polybutenes, alkylphenol-alkylene oxide condensates, alkenylsuccinic anhydrides, various silicones and alkyl or aryl phosphates, such as tricresyl phosphates. There may also be used 4,4'-methylene-bis-2,6-di-tert-butylphenol, trialkylphenols, tris(dimethyl-aminomethyl)-phenol, phenothiazine, naphthylamines, N'-sec-butyl - N,N-dimethyl - p-phenylenediamine, alkaline earth alkylphenates, alkaline earth salicylates, calcium phenylstearate, alkylamines, especially $C_{12}$–$C_{24}$ alkyl-amines, cyclic amines, alkyl and aryl imidazolines and alkenylsuccinic anhydrides reacted with amines and then with boron compounds, such as boron oxide, boron halides and boron esters.

A turbo prop lubricant may be prepared by blending the compounds of this invention with di-2-ethylhexyl sebacate and a mixture of polyesters formed by condensing 2-ethyl-1,3-hexanediol and sebacic acid into the polyesters with 2-ethyl-hexanol, there being an average of about 3 glycol units per molecule. This composition may also contain anti-oxidant, stabilizer or other useful additives.

The compounds, compositions and method of the present invention may be more fully understood from the following examples which are offered by way of illustration and not by way of limitation.

Example 1

A mixture of 205 g. of polybutenylsuccinic anhydride having an anhydride content of 0.488 millimole/g. (prepared from maleic anhydride and polybutene of molecular weight 1300), 23.8 g. of N-hydroxyethyl-5-carbethoxy-2-piperidone and 50 g. of xylene is heated in a reaction vessel at 90° to 100° C. for 3 hours with stirring. At the end of this time, the mixture becomes clear and an infrared analysis shows the disappearance of the anhydride bands indicating complete conversion to the half-acid ester. The final product is isolated by vacuum stripping of the solvent at 100° C. and filtering.

In the Panel Coker Test, a blend containing 1.5% of the above product gives a deposit weight of 38 mg. The same oil without the additive gives a deposit weight of 322 mg.

In the Sundstrand Pump Test at 0.015 g. in 100 ml. of oil, the weight of sludge is 6 mg., while the oil without any additive gives 240 mg.

1.5 parts of the above product is blended with 1 part of a commercial zinc dialkyl dithiophosphate into 97.5 parts of a 170 SUS Mid-Continent Solvent Extracted Neutral Oil. The viscosity of this blend is 6.03 cst. at 210° F. and 40.23 cst. at 100° F. with a viscosity index of 104. This blend is evaluated in the Sequence V-A Test giving a sludge rating at the end of 75 hours of engine operation of 62.8 (70.00=clean). The value for the reference oil alone is 40.2.

Example 2

A mixture of 217.3 g. of polybutenylsuccinic anhydride having an anhydride content of 0.488 millimole/g. (prepared from maleic anhydride and polybutene of molecular weight 1300), 46.4 g. of N-hydroxyethyl-5-carbethoxy-2-piperidone and 75.5 g. of xylene is charged to a reaction vessel fitted with a reflux condenser and water separator, and heated with stirring at 150° to 160° C. for 5 hours. At the end of this time, the theoretical amount of water (1.9 ml.) corresponding to 100% diester formation is collected in the water separator. The solution is filtered and the volatile solvent removed by heating on a rotary evaporator at 160° C. at 0.25 mm. for 2 hours. The product is a dark amber viscous liquid. Percent nitrogen found=1.30 (theory=1.26).

An equal amount of 100 SUS neutral oil is added to the above product. Two percent by weight of a silica gel is added to remove oil-insoluble matter. The mixture is stirred for 1 hour at 120° C., followed by filtration to remove the solids.

In the Panel Coker Test, a blend containing 3% of the above product gives a deposit weight of 53 mg. The same oil without the additive gives a deposit weight of 322 mg.

In the Sundstrand Pump Test at 0.03 g. in 100 ml. of oil, the weight of sludge is 7 mg., while the oil without any additive gives 240 mg.

Three parts of the above product is blended with 1 part of a commercial zinc dialkyl dithiophosphate and 6 parts of a commercial viscosity index improver into 90 parts of a 170 SUS Mid-Continent Solvent Extracted Neutral Oil. The viscosity of this blend is 11.54 cst. at 210° F. and 62.71 cst. at 100° F. with a viscosity index of 148. The ASTM pour point is −35° F. This blend is evaluated in the Sequence V-A Test giving a sludge rating at the end of 75 hours of engine operation of 67.5 (70.0=clean). The value for the reference oil alone is 40.2.

Two parts of the above product is blended with 1 part of phenothiazine and 1 part of tricresylphosphate into 96 parts of bis-2-ethylhexyl sebacate. The fluid is tested in the Panel Coker Test at 700° F. prescribed in Aircraft Turbine Engine Lubricating Oil Specification MIL-L-007808F. The deposit weight is 120 mg. The same lubricant without the product of this example gives a deposit weight of 305 mg.

Example 3

A mixture of 139 g. of polybutenylsuccinic anhydride with an anhydride content of 0.72 millimole/g. (prepared from maleic anhydride and polybutene of molecular weight 950), 103 g. of N-[2-hydroxypropyl]5-carbomethoxy-2-piperidone and 25 g. of xylene is allowed to react according to the procedure in Example 2. When the theoretical amount of water for the formation of the diester has been collected, the solution is filtered and stripped to a dark amber viscous liquid. The material has an acidity of 0.02 millimole/g., indicating essentially complete conversion to the diester.

In the Panel Coker Test, a blend containing 1.5% of the above product gives a deposit weight of 43 mg. The same oil without the additive gives a deposit weight of 322 mg.

In the Sundstrand Pump Test at 0.015 g. in 100 ml. of oil, the weight of sludge is 53 mg., while the oil without any additive gives 230 mg.

Example 4

A mixture of 362 g. of polybutenylsuccinic anhydride with an anhydride content of 0.276 millimole/g. prepared from maleic anhydride and polybutene of molecular weight 2200), 43.6 g. of N-2-hydroxyethyl-5-carbobutoxy-2-piperidone and 150 g. of xylene is allowed to react according to the conditions described in Example 2 such that the theoretical amount of water is distilled off in the xylene azeotrope. The product, after being stripped of its volatile components and filtered, has an acidity of 0.03 millimole/g.

In the Panel Coker Test, a blend containing 1.5% of the above product gives a deposit weight of 20 mg. The same oil without the additive gives a deposit weight of 322 mg.

In the Sundstrand Pump Test at 0.015 g. in 100 ml. of oil, the weight of sludge is 23 mg., while the oil without any additive gives 240 mg.

EXAMPLE 5

To a sample of 418 g. of the polybutenylsuccinic anhydride described in Example 1 are added 119 g. of N-2-hydroxyethoxyethyl-5-carbethoxy-2-piperidone and 150 g. of xylene. The reactants are heated for 15 hours at 140° C. so that 1 mole of water per mole of anhydride is collected in the xylene-water azeotrope. The reaction mixture is then stripped of volatile components under reduced pressure and filtered to give a dark amber viscous liquid—percent nitrogen=1.28 (theory=1.33).

In the Panel Coker Test, a blend containing 1.5% of the above product gives a deposit weight of 62 mg. The same oil without the additive give a deposit weight of 322 mg.

In the Sunstrand Pump Test at 0.015 g. in 100 ml. of oil, the weight of sludge is 22 mg., while the oil without any additive gives 240 mg.

EXAMPLE 6

A mixture of 382 g. of polybutenylsuccinic anhydride having an anhydride content of 0.546 millimole/g. (made from maleic anhydride and polybutene of molecular weight 1300), 42.5 g. of N-hydroxyethyl-5-N-methylcarbamyl-2-piperidone and 100 g. of xylene is heated with stirring at 90° to 100° C. until a sample shows the complete disappearance of the anhydride bands in the infrared (about 3 hours). The final product is obtained by stripping off the solvent under reduced pressure at 100° C.

In the Panel Coker Test, a blend containing 1.5% of the above product gives a deposit weight of 76 mg. The same oil without the additive gives a deposit weight of 322 mg.

In the Sundstrand Pump Test at 0.015 g. in 100 ml. of oil, the weight of sludge is 43 mg., while the oil without any additive gives 225 mg.

EXAMPLE 7

To a sample of 382 g. of the polybutenylsuccinic anhydride, described in Example 1, are added 84.9 g. of N-2-hydroxyethyl-5-N-methylcarbamyl-2-piperidone and 50 g. of xylene. The reactants are refluxed with stirring for 8 hours at 135° C. after which time the theoretical amount of water is collected in the xylene-water azeotrope. The product, after being stripped of volatile components and filtered has a nitrogen content of 2.57% (theory=2.75%).

In the Panel Coker Test, a blend containing 1.5% of the above product gives a deposit weight of 155 mg. The same oil without the additive gives a deposit weight of 322 mg.

In the Sundstrand Pump Test at 0.015 g. in 100 ml. of oil, the weight of sludge is 3 mg., while the oil without any additive gives 240 mg.

1.4 parts of the above product is blended with 1 part of a commercial zinc dialkyl dithiophosphate and 6 parts of a commercial visocity index improver into 91.6 parts of a 170 SUS Mid-Continent Solvent Extracted Neutral Oil. The viscosity of this blend is 11.14 cst. at 210° F. and 60.36 cst. at 100° F. with a viscosity index of 148. The ASTM pour point is −35° F. This blend is evaluated in the Sequence V-A Test giving a sludge rating at the end of 75 hours of engine operation of 68.6 (70.0=clean). The value for the reference oil alone is 40.2.

Four parts of the above product (Example 7) is blended with 0.7 part of 4,4′-methylenebis(2,6-di-t-butylphenol), 1.0 part of tricresyl phosphate, 0.3 part of sulfurized sperm oil, 5 parts of a commercial viscosity index improver into 89 parts of a 170 SUS Mid-Continent Solvent Extracted Neutral Oil. The viscosity of this blend is 11.03 cst. at 210° F. and 67.92 cst. at 100° F. with a viscosity index of 139. Its ASTM pour point is −40° F. This blend is evaluated in the Sequence V=A Test. The sludge rating at the end of 192 hours is 43.6 (50.0=clean). The value obtained without the above product is 20.8.

EXAMPLE 8

A mixture of 223 g. of polybutenylsuccinic anhydride (as used in Example 1), 52.3 g. of N-2-hydroxyethyl-5-N-n-butylcarbamyl-2-piperidone and 100 g. of xylene is refluxed with stirring at 140° C. for 8 hours. At the end of this time, the theoretical amount of water has been collected (2.0 ml.). The solvent is distilled off under vacuum and the dark amber viscous product filtered—Percent nitrogen=2.37 (theory=2.42)—Acidity=0.02 millimole/g.

In the Panel Coker Test, a blend containing 1.5% of the above product gives a deposit weight of 50 mg. The same oil without the additive gives a deposit weight of 322 mg.

In the Sundstrand Pump Test at 0.015 g. in 100 ml. of oil, the weight of sludge is 4 mg., while the oil without any additive gives 230 mg.

1.5 parts of the above product is blended with 1 part of a commercial zinc dialkyl dithiophosphate and 6 parts of a commercial viscosity index improver into 91.5 parts of a 170 SUS Mid-Continent Solvent Extracted Neutral Oil. The viscosity of this blend is 11.09 cst. at 210° F. and 61.06 cst. at 100° F. with a viscosity index of 147. The ASTM pour point is −35° F. This blend is evaluated in the Sequence V-A Test giving a sludge rating at the end of 75 hours of engine operation of 68.5 (70.0= clean). The value for the reference oil alone is 40.2.

In a second engine test, 1.5 parts of the above product is blended with 1 part of a commercial zinc dialkyl dithiophosphate, 6 parts of a commercial viscosity index improver and 2 parts of a basic calcium sulfonate (11.5% Ca, base number=300) into 89.5 parts of a 170 SUS Mid-Continent Solvent Extracted Neutral Oil. The viscosity of this blend is 11.47 cst. at 210° F. and 62.49 cst. at 100° F. with a viscosity index of 148. This blend is evaluated in the Sequence V-A Test giving a sludge rating at the end of 75 hours of engine operation of 69.2 (70.0=clean). The value for the reference oil alone is 40.2.

Four parts of the above product is blended with 5 parts of the commercial automatic transmission fluid additive, Lubrizol 280, and 4.5 parts of the commercial viscosity index improving additive into 86.5 parts of a 4.0 cst. at 210° F., 95 viscosity index base oil. The resulting blend has a viscosity of 7.5 cst. at 210° F.

The blend is tested under conditions of Federal Test Method 5308 at 300° F. At the end of 300 hours, the paper spot test shows the sludge to be dispersed. A similar test on a fluid without the above product fails at the end of 72 hours.

Example 9

A mixture of 410 g. of the polybutenylsuccinic anhydride, as used in Example 1, 57.6 g. of N-3-hydroxypropyl-5-N-n-octylcarbamyl-2-piperidone and 100 g. of xylene is refluxed with stirring at 150° C. until the theoretical amount of water is collected in the xylene-azeotrope. The product is isolated by distilling off the solvent at reduced pressure and filtering. Acid content=0.05 millieq./g.

In the Panel Coker Test, a blend containing 1.5% of the above product gives a deposit weight of 64 mg. The same oil without the additive gives a deposit weight of 322 mg.

In the Sundstrand Pump Test at 0.015 g. in 100 ml. of oil, the weight of sludge is 56 mg., while the oil without any additive gives 240 mg.

Example 10

A mixture of 205 g. of the polybutenylsuccinic anhydride, as used in Example 1, 67 g. of N-[2-hydroxydecaethoxyethyl]-5-N-t-octylcarbamyl-2-piperidone and 150 g. of xylene is heated at 175° C. with stirring until the water evolution in the xylene-water ceases. The product, after being stripped of volatile solvents and filtered, has a free acid content of 0.10 millimole/g., indicating nearly complete conversion to the diester.

In the Panel Coker Test, a blend containing 1.5% of the above product gives a deposit weight of 127 mg. The same oil without the additive gives a deposit weight of 322 mg.

In the Sundstrand Pump Test at 0.015 g. in 100 ml. of oil, the weight of sludge is 160 mg., while the oil without any additive gives 240 mg.

Example 11

A mixture of 172 g. of polypropenylsuccinic anhydride with an anhydride content of 0.581 millimole/g. (made from maleic anhydride and polypropylene of molecular weight 800), 19.0 g. of N-2-hydroxyethyl-5-carbethoxy-2-piperidone and 50 g. of xylene is heated with stirring at 100° C. for 4 hours. At the end of this time, the mixture becomes a clear solution and an infrared analysis indicates the complete disappearance of the anhydride bands. The solvent is stripped off at 100° C. under reduced pressure and the product filtered. The acidity is 0.55 millimole/g., indicating complete conversion to the monoester.

In the Panel Coker Test, a blend containing 1.5% of the above product gives a deposit weight of 29 mg. The same oil without the additive gives a deposit weight of 322 mg.

In the Sundstrand Pump Test at 0.015 g. in 100 ml. of oil, the weight of sludge is 17 mg., while the oil without any additive gives 240 mg.

Example 12

The half-acid amide of polypropenylsuccinic anhydride and methylamine is prepared by mixing 460 g. of polypropenylsuccinic anhydride (with an anhydride content of 0.435 millimole/g., made from maleic anhydride and polypropylene of molecular weight 1120), 15 g. of t-butylamine and 75 g. of benzene at 75° C. for 8 hours. An infrared spectrum of a sample of this product shows no anhydride content and the free acid content is 0.40 millimole/g. (0.42=theory).

The ester amide is prepared by adding 40.6 g. of N-[1-methyl-2-hydroxypropyl]-5-N-methylcarbamyl-2-piperidone and 150 g. of xylene to the above reaction product and heating at 150° C. for 8 hours, removing the water of reaction in the xylene azeotrope. The solvent and volatile components are removed by stripping under reduced pressure. The product, after filtering, has an acidity of 0.07 millimole/g.

In the Panel Coker Test, a blend containing 1.5% of the above product gives a deposit weight of 136 mg. The same oil without the additive gives a deposit weight of 322 mg.

In the Sundstrand Pump Test at 0.015 g. in 100 ml. of oil, the weight of sludge is 16 mg., while the oil without any additive gives 240 mg.

Eample 13

The half-acid amide of polypropenylsuccinic anhydride and dimethylamine is made by mixing 504 g. of polyoctenylsuccinic anhydride (anhydride content=0.397 millimole/g., made from maleic anhydride and poly-1-octene of molecular weight 1800) and 9.0 g. of dimethylamine in an autoclave and heated at 60° to 70° C. for 4 hours. The product has no anhydride peaks in the infrared, indicating complete reaction to the amide-acid. This is converted to the amide ester by heating at 150° C. for 8 hours with 60.2 g. N-(2-hydroxydecyl)-5-N,N-dimethylcarbamyl-2-piperidone and 150 g. of xylene. When the water evolution in the xylene azeotrope ceases, the product is stripped of volatile components at reduced pressure and filtered. It has an acid number of 0.05 millimole/g., indicating nearly complete conversion to the ester amide.

Example 14

The amide-acid of polyoctenylsuccinic anhydride and t-octylamine is prepared by mixing 252 g. of polyoctenylsuccinic anhydride used in Example 13, 129 g. of t-octylamine and 50 g. of benzene at 120° C. for 6 hours. At the end of this time, the infrared bands due to anhydride disappear thus showing complete reaction. It is converted to an ester amide by heating with stirring at 170° C. for 10 hours with 37.3 g. of N-[2-hydroxy-2-phenylethyl]-5-N-t-octylcarbamyl-2-piperidone and 100 g. of xylene. At the end of this time, the water of reaction ceases evolving and the volatile components are stripped off under reduced pressure and the product filtered. The acidity is 0.04 millimole/g.

In the Panel Coker Test, a blend containing 1.5% of the above product gives a deposit weight of 157 mg. The same oil without the additive gives a deposit weight of 322 mg.

In the Sundstrand Pump Test at 0.015 g. in 100 ml. of oil, the weight of sludge is 86 mg., while the oil without any additive gives 240 mg.

Example 15

A mixture of 470 g. of polybutenylsuccinic anhydride with an anhydride content of 0.237 millimole/g. (prepared from maleic anhydride and polybutane of molecular weight 1800), 57.5 g. of N-2-hydroxyethyl-5-carbethoxy-2-piperidone and 50 g. of xylene is allowed to react 4 hours at 160° C. such that the theoretical amount of water is distilled off in the xylene azeotrope. The product, after being stripped of its volatile components and filtered, has an acidity of 0.01 millimole/g.

In the Panel Coker Test, a blend containing 2.0% of the above product gives a deposit weight of 59 mg. The same oil without the additive gives a deposit weight of 322 mg.

In the Sundstrand Pump Test at 0.02 g. in 100 ml. of oil, the weight of sludge is 8 mg., while the oil without any additive gives 240 mg.

Two parts of the above product is blended with 1 part of a commercial zinc dialkyl dithiophosphate and 6 parts of a commercial viscosity index improver into 91 parts of a 170 SUS Mid-Continent Solvent Extracted Neutral Oil. The viscosity of this blend is 11.84 cst. at 210° F. and 66.48 cst. at 100° F. with a viscosity index of 146. The ASTM pour point is −35° F. This blend is evaluated in the Sequence V-A Test giving a sludge rating at the end of 75 hours of engine operation of 67.5 (70.0=clean). The value for the reference oil alone is 40.2.

I claim:

1. A composition comprising at least one of

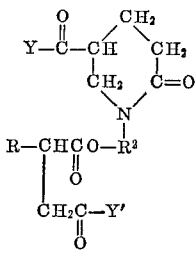

and

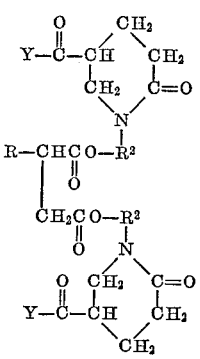

wherein R represents an alkenyl radical containing about 30 to 200 carbon atoms, $R^2$ represents alkylene, alkenylene or arylene of 2 to 25 carbon atoms in which at least two carbon atoms combine to form a chain between the piperidone nitrogen atom and the ether oxygen atom of the carboxyl group to which they are attached or a polyalkylene oxide group of the formula

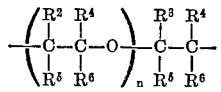

in which $R^3$, $R^4$, $R^5$ and $R^6$, individually, represent hydrogen, alkyl of 1 to 4 carbon atoms or phenyl and $n$ represents a number from 1 to 25, Y represents —OR′, —NQ$_2$ or

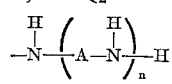

wherein R′ is alkyl of 1 to 24 carbon atoms, Q is hydrogen or alkyl of 1 to 24 carbon atoms, and A is an alkylene group of 2 to 6 carbon atoms, and Y′ represents —XZ, —NQ$_2$ or

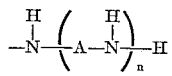

wherein Z is hydrogen, alkyl of 1 to 24 carbon atoms, phenyl, alkylphenyl in which the alkyl moiety contains a total of 1 to 8 carbon atoms, naphthyl, phenylalkyl in which the alkyl contains 1 to 8 carbon atoms, X is a chalcogen having an atomic weight of 16 to 32, Q and A are as previously defined and $n$ is a number of 1 to 10.

2. A composition according to said (I) of claim 1 wherein $R^2$ is alkylene,
Y is OR′ wherein
R′ is alkyl of 1 to 24 carbon atoms,
Y′ is XZ wherein
X is oxygen and
Z is hydrogen.

3. A composition according to said (I) of claim 1 wherein $R^2$ is alkylene,
Y is OR′ wherein
R′ is alkyl of 1 to 24 carbon atoms,
Y′ is XZ wherein
X is oxygen and
Z is alkyl of 1 to 24 carbon atoms.

4. A composition according to claim 1 wherein
R is derived from an olefin having 2 to 5 carbon atoms.

5. A composition according to claim 1 wherein
R is derived from an olefin having 4 carbon atoms.

6. A composition according to said (I) of claim 1 wherein $R^2$ is ethylene,
Y is ethoxy and
Y′ is hydroxy.

7. A composition according to said (II) of claim 1 wherein Y represents NQ$_2$ in which one of said Q is hydrogen and the other of said Q is alkyl of 1 to 24 carbon atoms.

8. A composition according to said (II) of claim 1 wherein $R^2$ is ethylene and
Y represents NQ$_2$ in which one of said Q is hydrogen and the other of said Q is butyl.

9. A composition according to said (II) of claim 1 wherein $R^2$ is ethylene and
Y is ethoxy.

10. A lubricating oil or normally liquid hydrocarbon fuel containing a minor amount, sufficient to impart dispersancy, of a composition according to claim 1.

11. A lubricating oil containing a minor amount, sufficient to impart dispersancy, of a composition according to claim 9.

References Cited

UNITED STATES PATENTS

| | | | |
|---|---|---|---|
| 3,219,666 | 11/1965 | Norman et al. | 252—51.5 XR |
| 3,269,946 | 8/1966 | Wiese | 252—51.5 XR |
| 3,311,558 | 3/1967 | Prizer et al. | 252—51.5 XR |

PATRICK P. GARVIN, *Primary Examiner.*

UNITED STATES PATENT OFFICE
CERTIFICATE OF CORRECTION

Patent No. 3,399,141                                    August 27, 1968

David H. Clemens

It is certified that error appears in the above identified patent and that said Letters Patent are hereby corrected as shown below:

Column 13, line 66, "$R^2$" should read -- $R^3$ --.

Signed and sealed this 3rd day of March 1970.

(SEAL)
Attest:

Edward M. Fletcher, Jr.                       WILLIAM E. SCHUYLER, JR
Attesting Officer                                  Commissioner of Patents